Figure 1:
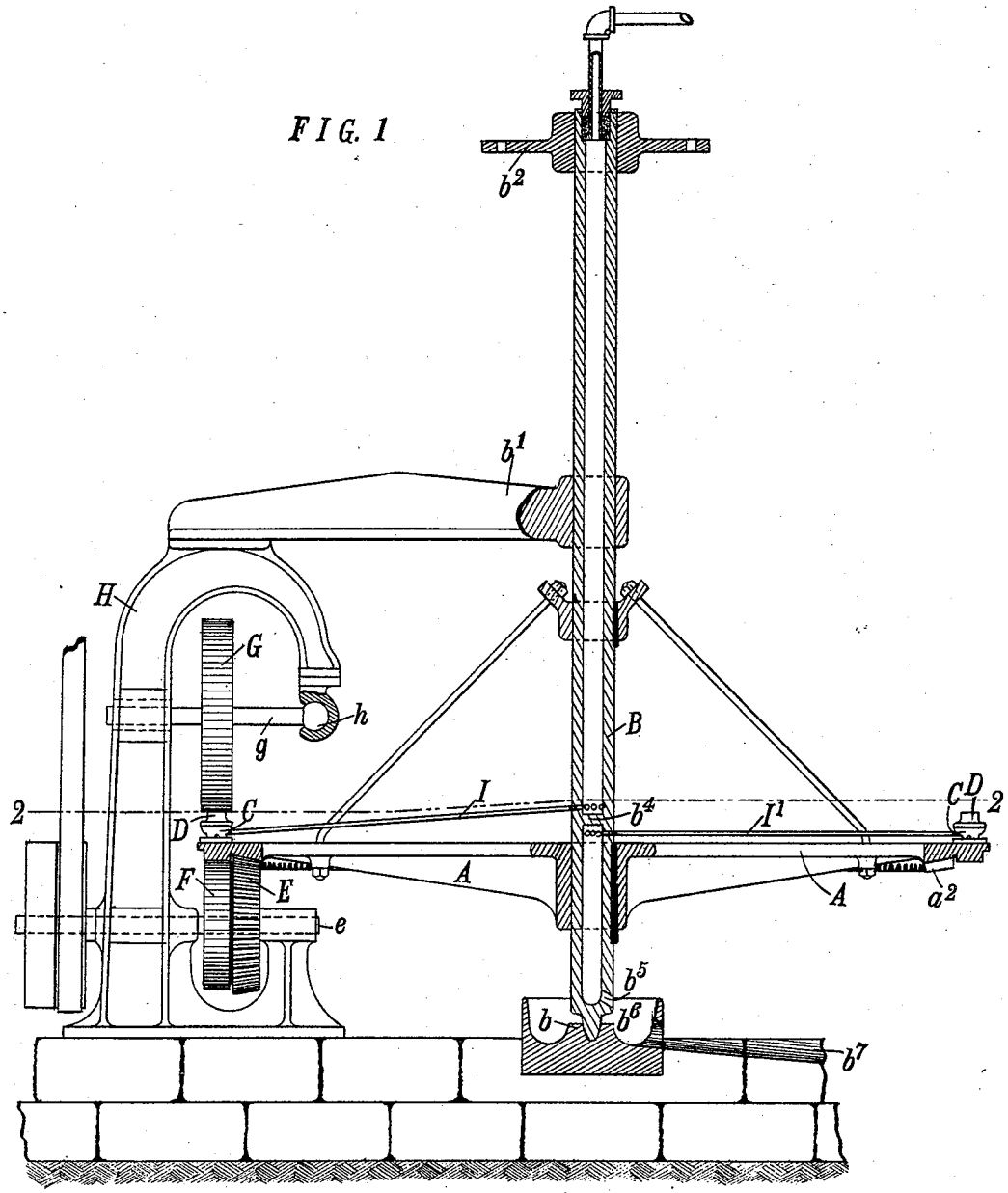

(No Model.) 3 Sheets—Sheet 2.
F. C. DAMM.
MACHINE FOR MOLDING PLASTIC MATERIAL.
No. 496,399. Patented May 2, 1893.

WITNESSES.
Frank Meiller.
M. S. Ingham.

INVENTOR.
Frederick C. Damm
By Wing & Thurston
his attorneys (No Model.) 3 Sheets—Sheet 3.

F. C. DAMM.
MACHINE FOR MOLDING PLASTIC MATERIAL.

No. 496,399. Patented May 2, 1893.

WITNESSES.
Frank Miller.
M. S. Ingham.

INVENTOR.
Frederick C. Damm
Ewing & Thurston
his attorneys

UNITED STATES PATENT OFFICE.

FREDERICK C. DAMM, OF FINDLAY, OHIO, ASSIGNOR TO CHARLES H. RAYNOR, OF ADRIAN, MICHIGAN.

MACHINE FOR MOLDING PLASTIC MATERIAL.

SPECIFICATION forming part of Letters Patent No. 496,399, dated May 2, 1893.

Application filed November 12, 1892. Serial No. 451,788. (No model.)

*To all whom it may concern:*

Be it known that I, FREDERICK C. DAMM, a citizen of the United States, residing at Findlay, in the county of Hancock and State of Ohio, have invented certain new and useful Improvements in Machines for Molding Plastic Material; and I do hereby declare the following to be a full, clear, and exact description of the invention, such as will enable others skilled in the art to which it appertains to make and use the same.

My invention relates to the class of machines which is particularly adapted to molding such small objects as flying targets from material which is plastic when hot, but which hardens as it becomes cold. One class of such machines employs a revolving horizontal table which carries a series of molds, and this table is moved intermittently so as to successively bring the several molds beneath a vertically movable plunger which presses the plastic material in the molds into shape. This class of machines is measurably successful in use, but the repeated stopping and starting of the heavy mold-carrying table is objectionable in that it tends to make the machine short lived, while at the same time much time is lost in the stopping and starting operations.

The object of my invention is to provide a machine of the general character named in which the mold carrier shall have a uniform and uninterrupted movement whereby the machine will not only have greater capacity than prior machines, but will also be more durable.

To this end my invention consists in the construction and combination of parts hereinafter described and pointed out in the claims, and shown in the drawings in which—

Figure 2:
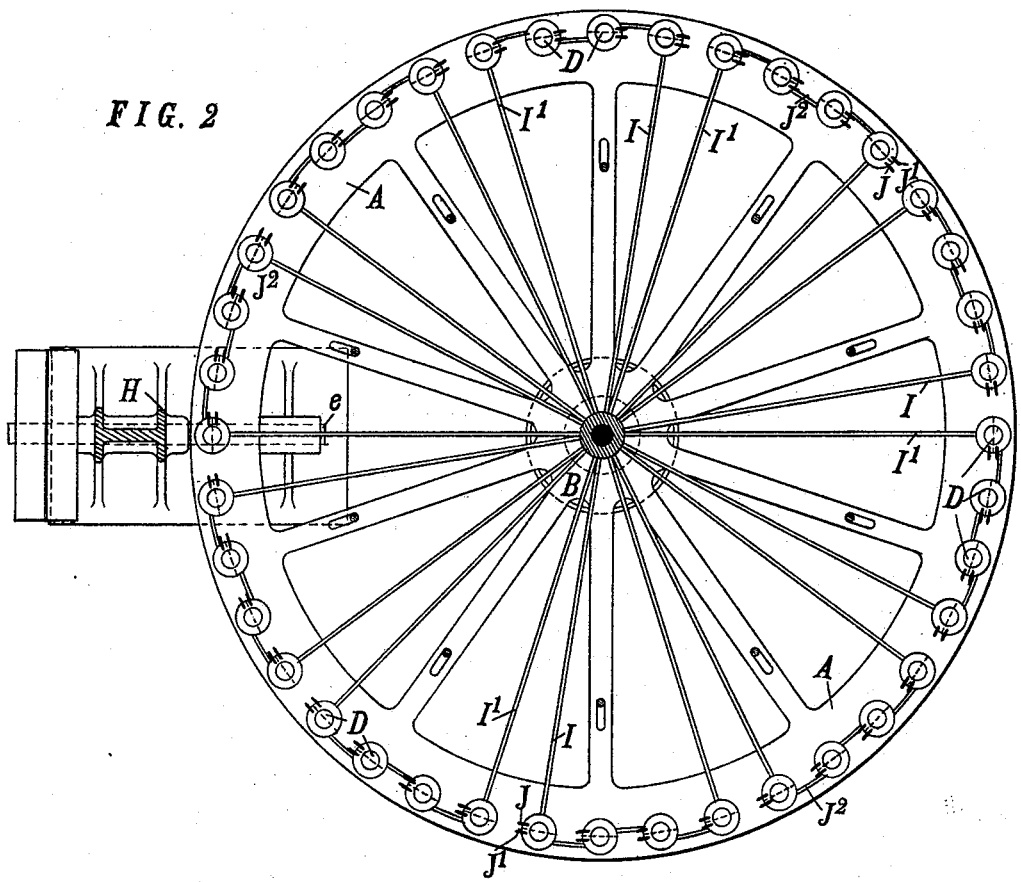
Figure 3:
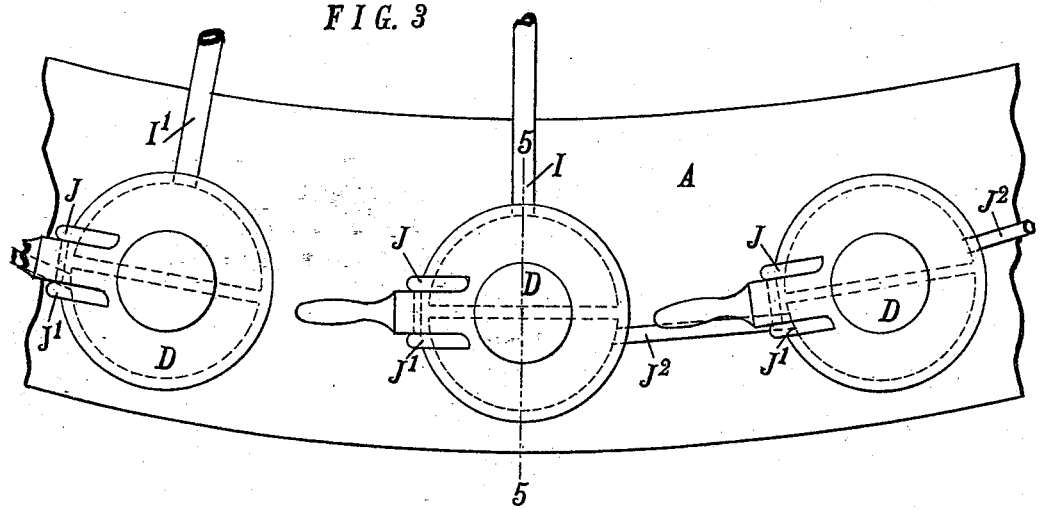
Figure 4:
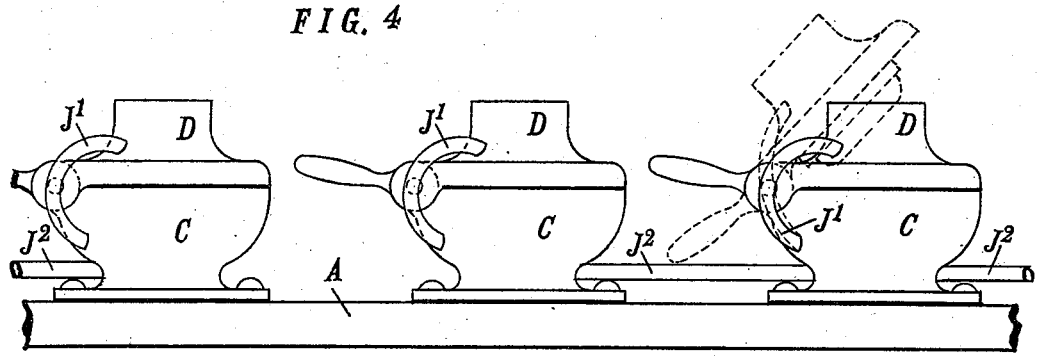
Figure 5:
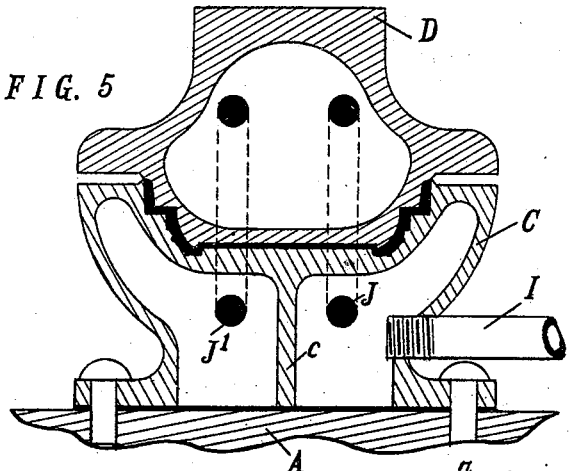

Figure 1 is a side elevation partly in section of my improved machine. Fig. 2 is a plan view of the same. Fig. 3 is an enlarged plan; and Fig. 4 an enlarged side elevation of a section of the mold revolving table and the mold carried thereby; and Fig. 5 is a central sectional view of a mold on line 5—5 seen in Fig. 3.

I will now give a detailed description of the mechanism shown in the drawings.

A represents a revoluble circular platform or table. It is secured to a vertical shaft which is mounted in a step bearing $b$ at its lower end and is steadied by additional fixed bearings $b'$ and $b^2$. On the upper side of the table A a series of molds C is secured,— which molds are arranged in a concentric circle around the axis of the shaft B. For each mold an independent plunger D is provided, and the plungers are suitably arranged to enter and co-operate with their corresponding molds in pressing the plastic material in the mold into the desired shape. In the construction shown each plunger is hinged to its corresponding mold like a cover thereto; and each plunger is provided with a handle whereby it may be swung on its hinge to either open or close the top of the mold as occasion requires.

The molds and plungers shown are formed to make the so called flying targets, which are commonly made from a mixture of pitch and clay or plaster; and the entire machine as shown is organized with reference to the manufacture of these and other articles which are made from a material which becomes plastic when heated and hard when cooled.

On the under side of the table A is a bevel gear $a^2$, which engages with a bevel gear E secured to the horizontal driven shaft $e$, whereby the table A is revolved. A flat faced wheel F is likewise secured to the shaft $e$, and lies beneath and engages with the under side of that part of the table A on which the molds are secured. By this means the table is held in a horizontal position notwithstanding the pressure applied to the plungers, and the proper relative position of the bevel gears $a^2$ and E is preserved.

G represents the pressure device which is in the form of a wheel secured to a shaft $g$ and arranged in a position to engage with the tops of the several plungers, D,—that is to say in the construction shown the wheel G lies directly above the wheel F. The pressure on the plungers by which the material is molded is due to the weight of the wheel G, consequently the shaft $g$ must have a limited vertical movement. This result is secured by providing a ball and socket bearing $h$ at one end of the shaft $g$, while the other end lies in and is guided by a vertical slot in the standard H.

The plastic material is put into a mold while the table A is revolving and the corresponding plunger is closed. When the mold is carried beneath the wheel G the weight of said wheel forces said plunger down into the mold with sufficient force to shape the article. While the table A is still revolving, the plunger cover is lifted and the molded article removed.

When the machine is employed to mold material which is plastic when hot, some means must be provided to keep the molds cool. I secure this result by forming chambers in both the molds and plungers and conducting cold water to and from said chambers by the construction shown, viz.,—the shaft B is made hollow and a partition $b^4$ is placed in the bore in the vicinity of the level of the table A. The chamber in the molds is divided by a partition $c$, and the molds are connected into groups of say four each. An inlet pipe I connects the hollow shaft above the partition $b^4$ with one chamber in the mold. This chamber is connected by a pipe J with the chamber in the plunger, and another pipe $J'$ connects said chamber with the other chamber in the mold. An outlet pipe $J^2$ connects the last named chamber with one chamber in the next mold. The parts of all the molds in each group and their plungers are constructed and connected in like manner. One chamber in the last mold in the series is connected by means of the outlet pipe $I'$ with the hollow shaft B below the partition. Thus the cold water introduced into the shaft B above its partition $b^4$ passes to and through each group of molds as described, and is finally discharged into said pipe B below the partition from whence it flows out through an orifice $b^5$ into an annular gutter $b^6$ from which it is finally discharged through the waste gutter $b^7$.

In order that the connections between the molds and their respective plungers shall not interfere with the described action of the parts, the pipes J J' are made so long that they offer no impediment to the opening of the molds by the swinging of the plungers, and of some flexible material such as rubber so that they will bend readily during the movements of said plunger.

Having thus described my invention, I claim—

1. In a machine for molding plastic material, in combination, a revoluble table, a series of molds carried thereby, a series of plungers adapted to co-operate with the molds, mechanism for continuously revolving said table, and a pressure device arranged above the table and adapted to engage with and act upon the several plungers while the table is in motion, substantially as and for the purpose set forth.

2. In a machine for molding plastic material, in combination, a horizontal revoluble table, a series of molds secured thereto, plungers hinged to the several molds, mechanism for revolving said table, and loosely mounted wheel arranged above the table and adapted to engage with and press upon said plungers as they are carried beneath it by the movement of the table, substantially as specified.

3. In a machine for molding plastic material, in combination, a horizontal revoluble table, a series of molds and a series of corresponding hinged plungers carried by said table, a bevel gear on said table, a bevel gear which engages therewith, means for revolving the bevel gear last named and a pressure device arranged above the table and adapted to apply pressure to the plungers while the table is in motion, substantially as specified.

4. In a machine for molding plastic material, in combination, a horizontal revoluble table, a series of molds and a corresponding series of plungers carried thereby, a loosely mounted wheel arranged above the table and adapted to apply pressure to said plungers while the table is in motion, a wheel upon which the table rests arranged nearly beneath the pressure wheel, and mechanism for revolving said table, substantially as specified.

5. In a machine for molding plastic material, in combination, a horizontal revoluble table, a series of molds and a corresponding series of hinged plungers carried thereby, a pressure wheel, the shaft to which said wheel is secured, a ball and socket bearing at one end of said shaft, vertical guides for the other ends thereof, and mechanism for revolving said table, substantially as specified.

6. In a machine for molding plastic material, in combination, a horizontal revoluble table, a series of molds and a corresponding series of hinged plungers carried thereby, a vertically movable shaft, a pressure wheel secured thereto and adapted to engage with the several plungers while the table is in motion, and means for revolving said table, substantially as specified.

7. In a machine for molding plastic material, in combination, a mold having two internal chambers, a chambered plunger hinged thereto, an inlet pipe connected with one chamber in the mold, an outlet pipe connected with the other chamber, and two flexible pipes which connect the chamber in the plunger with the chambers in the mold, substantially as specified.

8. In a machine for molding plastic material, in combination, a tubular vertical shaft mounted in suitable bearings and having a partition $b^4$, a mold-carrying table secured thereto, a series of molds each of which has two chambers, a series of corresponding chambered plungers, inlet pipes connecting the upper part of the shaft with one of the chambers in some of the molds, outlet pipes connecting the other of the chambers in said molds with the lower part of said shaft, and flexible pipes connecting the chamber in each plunger with both of the chambers in the corresponding mold, substantially as specified.

In testimony whereof I affix my signature in presence of two witnesses.

FREDERICK C. DAMM.

Witnesses:
J. H. SHELDON,
C. H. WISOR.